United States Patent Office 3,721,709
Patented Mar. 20, 1973

3,721,709
SUBSTITUTED BENZANILIDES
Albrecht Mueller, Frankenthal, Hans Osieka, Ludwigshafen, and Ernst-Heinrich Pommer, Limburgerhof, Germany, assignors to Badische Anilin- & Soda-Fabrik Aktiengesellschaft, Ludwigshafen (Rhine), Germany
No Drawing. Filed May 24, 1971, Ser. No. 146,449
Int. Cl. C07c *103/30*
U.S. Cl. 260—558 D
4 Claims

ABSTRACT OF THE DISCLOSURE

New and valuable substituted benzanilides having a good fungicidal action and a process for controlling fungi with these compounds.

---

This invention relates to new, substituted benzanilides having a fungicidal action for use in the plant protection and wood preservation field.

It is known to use tetramethylthiuram disulfide as a fungicide. However, its action is not satisfactory.

We have now found that substituted benzanilides of the general formula

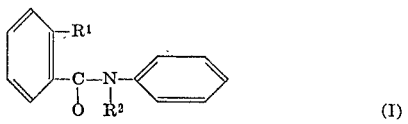

(I)

where $R^1$ denotes methyl, halogen (fluorine, chlorine, iodine, bromine), $-CF_3$ or nitro and $R^2$ denotes acetyl, haloacetyl (chloroacetyl, $ClCH_2CO-$), or formyl, have a good fungicidal action.

The new compounds may be prepared by reacting benzanilides of the formula

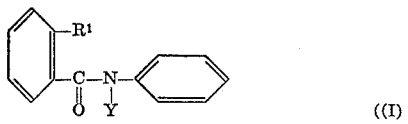

((I))

with acid chlorides of the formula

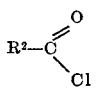

($R^1$ and $R^2$ having the meanings given above), or by reacting an acid anilide of the formula

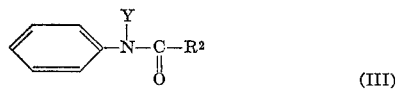

(III)

(Y denoting hydrogen or alkali metal) with a benzyl chloride of the formula

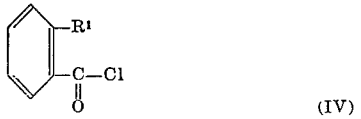

(IV)

in the presence or absence of a solvent or a mixture of solvents and within a wide temperature range, preferably between 0° and 100° C. When Y denotes hydrogen it is advantageous for facilitating and accelerating the reaction to add an inorganic or organic base such as pyridine, quinoline, triethylamine, dialkylcyclohexylamine, etc., preferably in stoichiometric amounts.

The new compounds have a remarkable fungicidal action, and are therefore particularly suitable for controlling rusts in crop plants and seedling diseases caused by *Rhizoctonia solani*. The compounds are also suitable for controlling *Sclerotium rolfsii* and ligniperdous fungi, such as *Coniophora cerebella* (house fungus).

The preparation of the active ingredients is illustrated below.

EXAMPLE 1

Preparation of o-nitrobenzoic-N-acetyl-anilide 22.4 parts (by weight) of o-nitrobenzanilide is dissolved in a mixture of 400 parts of toluene and 100 parts of chloroform; 19 parts of pyridine is then added. At 20° C., 15 parts of acetyl chloride is slowly introduced. The temperature of the reaction mixture rises to about 40° C. The mixture is subsequently stirred for 6 hours at 90° C. After the mixture has cooled, the precipitated amine hydrochloride is filtered off and the solvent distilled off in vacuo. The brown crystalline residue is recrystallized from methanol.
  Melting point: 106° to 108° C.
  Yield: 86.7% (after recrystallization).
  *Analysis.*—(284.28). Calcd. (percent): C, 63.3; H, 4.3; N, 9.9. Found (percent): C, 63.4; H, 4.4; N, 10.0.

EXAMPLE 2

Preparation of o-iodobenzoic-N-acetyl-anilide 25 parts of triethylamine is added to a solution of 32 parts of acetanilide in 100 parts of acetone. While cooling with ice, a solution of 66 parts of o-iodobenzoyl chloride in 100 parts of acetone is slowly introduced. The reaction mixture is stirred for 2 hours at 20° C. and subsequently for 2 hours under reflux. The precipitated triethylamine hydrochloride is filtered off and the solution concentrated in vacuo. The residue is dissolved in a mixture of methanol and water and clarification is carried out with animal charcoal. After the solvent has been distilled off, a pale yellow, highly viscous oil is obtained.
  Yield: 90.3% (infrared band at 1705 cm.$^{-1}$).
  *Analysis.*—(365.2). Calcd. (percent): C, 49.4; H, 3.3; I, 34.7; N,3.8. Found (percent): C, 49.6; H, 3.7; I, 34.1; N, 4.1.

The other compounds may be produced analogously.
Examples of the compounds according to the invention are as follows:

(1) N-acetyl-o-methylbenzanilide;
(2) N-acetyl-o-nitrobenzanilide, M.P. 106° to 108° C.;
(3) N-acetyl-o-chlorobenzanilide;
(4) N-acetyl-o-iodobenzanilide;
(5) N-acetyl-o-fluorobenzanilide;
(6) N-acetyl-o-trifluoromethylbenzanilide;
(7) N-acetyl-o-bromobenzanilide;
(8) N-chloroacetyl-o-methylbenzanilide;
(9) N-chloroacetyl-o-nitrobenzanilide;
(10) N-chloroacetyl-o-chlorobenzanilide;
(11) N-chloroacetyl-o-iodobenzanilide;
(12) N-chloroacetyl-o-fluorobenzanilide;
(13) N-chloroacetyl-o-bromobenzanilide;
(14) N-chloroacetyl-o-$CF_3$-benzanilide;
(15) N-formyl-o-methylbenzanilide;
(16) N-formyl-o-nitrobenzanilide;
(17) N-formyl-o-chlorobenzanilide;
(18) N-formyl-o-iodobenzanilide;
(19) N-formyl-o-fluorobenzanilide;
(20) N-formyl-o-bromobenzanilide;
(21) N-formyl-o-$CF_3$-benzanilide.

In compounds 8 to 14 the N-chloroacetyl radical may be replaced by N-bromoacetyl and N-fluoroacetyl.

The agents according to the invention may be used as solutions, emulsions, suspensions or dusts. The form of application depends entirely on the purpose for which the agents are being used; in any case it should ensure a fine distribution of the active ingredient.

For the preparation of solutions to be sprayed direct, hydrocarbons having boiling points higher than 150° C., e.g. tetrahydronaphthalene or alkylated naphthalenes, or organic liquids having boiling points higher than 150° C. and having one or more than one functional group, e.g. the keto group, the ether group, the ester group or the amide group, this group or these groups being attached as substituent(s) to a hydrocarbon chain or being a component of a heterocyclic ring, may be used as spray liquids.

Aqueous formulations may be prepared from emulsion concentrates, pastes or wettable powders by adding water. To prepare emulsions the ingredients as such or dissolved in a solvent may be homogenized in water or organic solvents by means or wetting or dispersing agents, e.g. polyethylene oxide adducts. Concentrates which are suitable for dilution with water may be prepared from active ingredient, emulsifying or dispersing agent and possibly solvent.

Dusts may be prepared by mixing or grinding the active ingredients with a solid carrier, e.g. kieselguhr, talc, clay or fertilizers.

The following examples demonstrate the action of the fungicides.

EXAMPLE 3

The active ingredients are dissolved in amounts of 0.01 and 0.025% (by weight) in acetone and uniformly distributed in a still liquid malt nutrient agar. This agar is then poured into Petri dishes having a diameter of 9 cm. After solidification of the agar, the dishes are centrally inoculated with mycelium flakes of *Rhizoctonia solani* and *Coniophora cerebella*. The dishes are incubated at 25° C. and after 6 days the extent of the development of the fungus colony is assessed.

0 = no fungus growth
1 = diameter of the fungus colony 0.5 to 1.5 cm.
2 = diameter of the fungus colony 1.5 to 3.5 cm.
3 = diameter of the fungus colony 3.5 to 4.5 cm.
4 = diameter of the fungus colony 4.5 to 7 cm.
5 = diameter of the fungus colony 7 to 9 cm.

| Active ingredient | *Rhizoctonia solani*, percent active ingredient in the agar | | *Coniophora crebella*, percent active ingredient in the agar | |
|---|---|---|---|---|
| | 0.01 | 0.025 | 0.01 | 0.025 |
| Phenyl-CH₃, –CO–N(CH₃)–CO–phenyl | 0 | 0 | 0 | 0 |
| Phenyl-I, –CO–N(CH₃)–CO–phenyl | 0 | 0 | 0 | 1 |
| Phenyl-Br, –C(=O)–N(CH₃)–CO–phenyl | 0 | 0 | 0 | 0 |
| Phenyl-NO₂, –C(=O)–N(CH₃)–CO–phenyl | 1 | 1 | 0 | 1 |
| Tetramethylthiuram disulfide (TMTD) (comparative agent) | 4 | 4 | 4 | 5 |
| Control (untreated) | 5 | | 5 | |

EXAMPLE 4

Leaves of bean plants grown in pots are artificially infected with spores of bean rust (*Uromyces fabae*) and placed for 48 hours at 20° to 25° C. in a moisture-saturated chamber. The leaves are subsequently sprayed with aqueous emulsions of mixtures of 80% (by weight) of active ingredient and 20% of emulsifier and placed in a greenhouse at a temperature of from 20° to 22° C. and 75 to 80% relative humidity. After 10 days the extent of the fungus development is assessed.

| Active ingredient | Extent of attack; amount of active ingredient in spray in percent | | |
|---|---|---|---|
| | 0.1 | 0.05 | 0.025 |
| Phenyl-CH₃, –CO–N(CH₃)–CO–phenyl | 0 | 0 | 0 |
| Phenyl-I, –CO–N(CH₃)–CO–phenyl | 0 | 0 | 1 |
| Phenyl-CF₃, –CO–N(CH₃)–CO–phenyl | 0 | 0 | 0 |
| Control (untreated) | 5 | | |

0 = no attack, graded down to 5 = leaves completely covered with fungus.

EXAMPLE 5

70 parts by weight of the compound of Example 1 is mixed with 30 parts by weight of N-methyl-α-pyrrolidone. A mixture is obtained which is suitable for application in the form of very fine drops.

EXAMPLE 6

20 parts by weight of the compound of Example 2 is dissolved in a mixture consisting of 80 parts by weight of xylene, 10 parts by weight of the adduct of 8 to 10 moles of ethylene oxide to 1 mole of oleic acid-N-monoethanolamide, 5 parts by weight of the calcium salt of dodecylbenzenesulfonic acid, and 5 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 7

20 parts by weight of the compound of Example 1 is dissolved in a mixture consisting of 40 parts by weight of cyclohexanone, 30 parts by weight of isobutanol, 20 parts by weight of the adduct of 7 moles of ethylene oxide to 1 mole of isooctylphenol, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 8

20 parts by weight of the compound of Example 2 is dissolved in a mixture consisting of 25 parts by weight of cyclohexanol, 65 parts by weight of a mineral oil fraction having a boiling point between 210° and 280° C., and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 9

20 parts by weight of the compound of Example 1 is well mixed with 3 parts by weight of the sodium salt of diisobutylnaphthalene-α-sulfonic acid, 17 parts by weight of the sodium salt of a ligninsulfonic acid obtained from a sulfite waste liquor, and 60 parts by weight of powdered silica gel, and triturated in a hammer mill. By uniformly distributing the mixture in 20,000 parts by weight of water, a spray liquid is obtained containing 0.1% by weight of the active ingredient.

EXAMPLE 10

3 parts by weight of the compound of Example 2 is intimately mixed with 97 parts by weight of particulate kaolin. A dust is obtained containing 3% by weight of the active ingredient.

EXAMPLE 11

30 parts by weight of the compound of Example 1 is intimately mixed with a mixture consisting of 92 parts by weight of powdered silica gel and 8 parts by weight of paraffin oil which has been sprayed onto the surface of this silica gel. A formulation of the active ingredient is obtained having good adherence.

We claim:
1. A substituted benzanilide of the formula

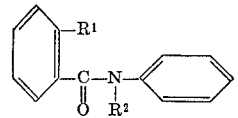

where $R^1$ denotes methyl, halogen or $CF_3$ and $R^2$ denotes formyl, acetyl or chloroactyl.
2. 2-methylbenzoic-N-acetyl-anilide.
3. 2-iodobenzoic-N-acetyl-anilide.
4. 2-trifluoromethylbenzoic-N-acetyl-anilide.

References Cited

R. Tanasescu et al.: Berichte, vol. 72, pp. 1083–93 (1939).

HARRY I. MOATZ, Primary Examiner

U.S. Cl. X.R.

260—558 S; 79—118